United States Patent [19]

Breford

[11] 3,899,194
[45] Aug. 12, 1975

[54] ADJUSTABLE LIST PIN BOX

[75] Inventor: Glenn H. Breford, Holyrood, Kans.

[73] Assignee: Midway Industries, Inc., Holyrood, Kans.

[22] Filed: Mar. 28, 1974

[21] Appl. No.: 455,862

[52] U.S. Cl. .......................... 280/438 R; 280/423 R
[51] Int. Cl. ............................................. B62d 53/08
[58] Field of Search ............ 280/438, 423 R, 423 B, 280/415 R, 415 B, 407

[56] References Cited
UNITED STATES PATENTS

| | | | |
|---|---|---|---|
| 2,425,521 | 8/1947 | Ellberg | 280/438 R |
| 2,857,174 | 10/1958 | Brown | 280/438 R |
| 2,923,560 | 2/1960 | Anderson | 280/407 |
| 2,925,286 | 2/1960 | Hodges et al. | 280/423 R |
| 3,021,155 | 2/1962 | Sherman | 280/438 R X |
| 3,791,674 | 2/1974 | Berends | 280/423 R X |
| 3,820,821 | 6/1974 | Leland | 280/423 R |

Primary Examiner—Leo Friaglia
Assistant Examiner—R. Schrecengost
Attorney, Agent, or Firm—John H. Widdowson

[57] ABSTRACT

An adjustable list pin box for interconnecting a tractor and a trailer, or the like, comprising an upper member rigidly secured on the tongue portion of the trailer and extending downwardly therefrom, and a stanchion member connecting to the upper member. A hitch engaging member is pivotally mounted on the lower portion of the stanchion member and engages a fifth wheel type hitch on the tractor and pivots on an axis substantially aligned with the longitudinal axis of the trailer.

16 Claims, 6 Drawing Figures

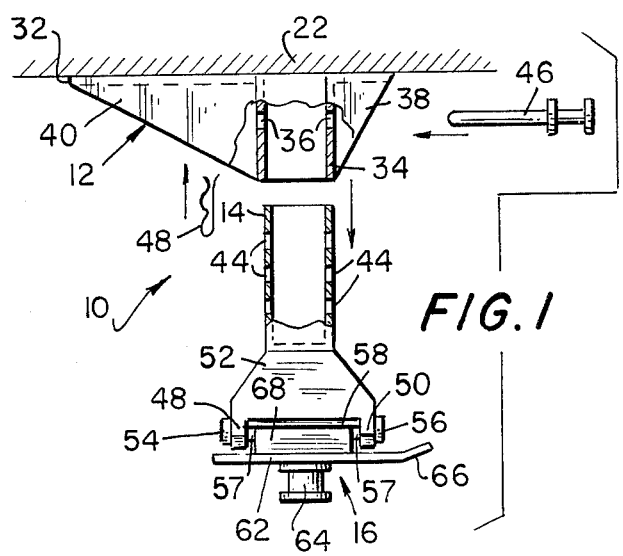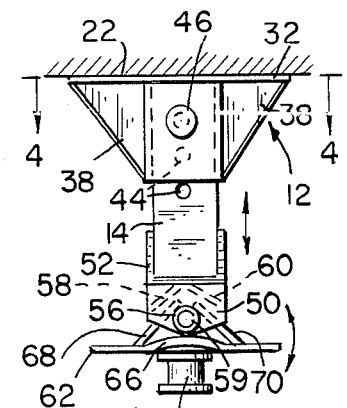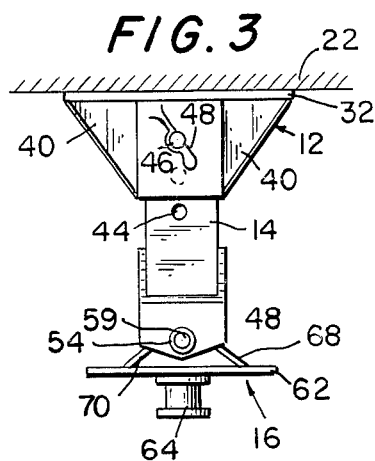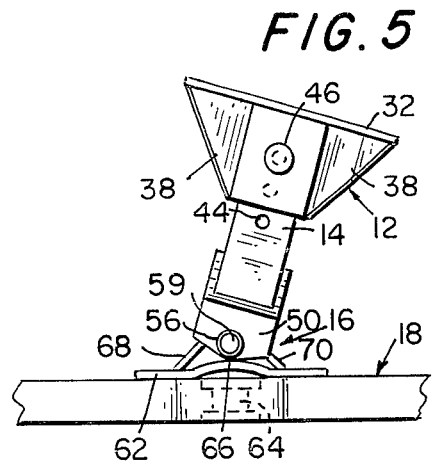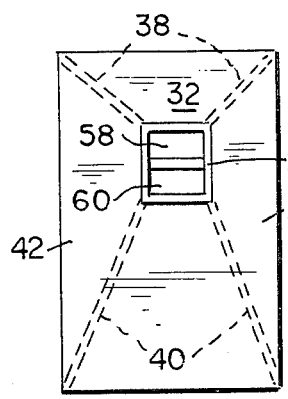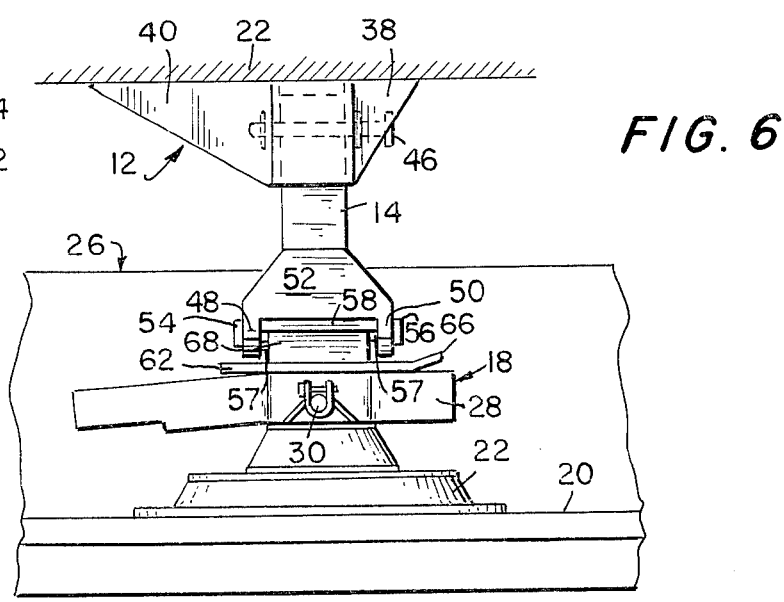

ADJUSTABLE LIST PIN BOX

BACKGROUND OF THE INVENTION

1. Field of the Invention

The invention is related to an adjustable list pin box. More specifically, this invention provides an adjustable list pin box for interconnecting a tractor and a trailer which utilize a fifth wheel trailer hitch.

2. Description of the Prior Art

Numerous constructions of fifth wheel trailer hitches and fifth wheel trailer hitch couplers are known in the prior art; however, these structures generally use a ball member and a socket member to achieve horizontal, vertical and yawing motion between the tractor vehicle and the trailer vehicle; or they use a coupling pin to achieve horizontal pivoting motion, a pivotal hitch to achieve vertical pivoting and have no provision for yawing motion between the vehicles. The latter identified conventional constructions are typically used on lengthly commercial semi-trailer trucks and the like when the fifth wheel hitch mounted on the rear of the tractor vehicle. In these vehicles, the side to side pivoting motion is taken up in the structure of the trailer wherein the frame thereof is twisted. In the hitch constructions using the ball and socket, such are usually not desirable due to the expense involved in making the balls and sockets and periodic inspections and replacements thereof.

This type of hitch tends to wear considerably since the load is at all times carried on a relatively small portion of the ball and socket. For the trailer hitches of the fifth wheel type generally used with small utility trailers and travel trailers and the like, the fifth wheel hitch is constructed to pivot such that there can be vertical motion between the pulling vehicle and the trailer as well as pivoting in the horizontal direction; however, generally there is no pivotal connection in the hitch apparatus for side to side pivoting of the vehicles, one relative to the other. Also, there are no provisions in the prior art for being able to adjust the hitch apparatus when the height distance between the fifth wheel type hitch and the tongue of the trailer vary with sundry types of tractor and trailers.

SUMMARY OF THE INVENTION

The present invention accomplishes its desired object by broadly providing an upper member rigidly secured on a tongue portion of a trailer and extending downwardly therefrom, a stanchion member connecting to the upper member, and a hitch engaging member pivotally mounted on a lower portion of the stanchion member. The hitch engaging member engages a fifth wheel type hitch on the tractor and pivots on an axis substantially aligned with the longitudinal axis of the trailer, to permit yawing motion or side to side motion of the trailer relative to the hitch on the towing vehicle.

Further, it is an object of the present invention to provide an adjustable list pin box overcoming the aforementioned disadvantages of the prior art devices.

It is another object of the invention to provide an adjustable list pin box which interconnects a trailor having a tongue portion and a tractor with a fifth wheel type hitch.

It is still another object of the invention to provide an adjustable list pin box having a height adjusting means to compensate for discrepancy in distance between the tongue portion and the fifth wheel type hitch of any conventional type trailer and tractor, respectively.

These, together with various ancillary objects and features which will become apparent as the following description proceeds are obtained by this novel adjustable list pin box, a preferred embodiment being shown in the accompanying drawings, by way of example only wherein:

BRIEF DESCRIPTION OF THE DRAWINGS

FIG. 1 is a fragmentary, side vertical sectional view of the adjustable list pin box having the upper member secured to a tongue portion of a trailer and including the stanchion member as being removed from the upper member and capable of height adjustment by utilization of the removable combination of carter and axis pin;

FIG. 2 is a front elevational view of the adjustable list pin box alone with portions of the interior thereof shown is dashed lines and having the axis pin interconnecting the stanchion member and the upper member;

FIG. 3 is a back elevational view of the adjustable list pin box;

FIG. 4 is a top plan view taken along the plane of line 4—4 in FIG. 2;

FIG. 5 is a front elevational view of the adjustable list pin box mounted in the hitched position with the center portion of a fifth wheel trailer hitch, the pin box being in a pivoted position; and FIG. 6 is a side elevational view of the rear portion of a truck bed having a fifth wheel trailer hitch and the tongue portion of a trailer with portions of the truck bed cut away for clarity, and having the adjustable list pin box secured to the trailer tongue and mounted with the fifth wheel trailer hitch.

DETAILED DESCRIPTION OF THE INVENTION

Referring in detail now to the drawings, wherein similar or like parts of the invention are identified by identical reference numerals, an adjustable list pin box, generally indicated as 10, includes an upper member 12, a stanchion member 14, slidably connecting to the upper member 12 and a hitch engaging member, generally indicated as 16, pivotally mounted on a lower portion of the stanchion member 14. The hitch engaging member 16 engages a fifth wheel type hitch, generally indicated as 18, which is mounted in a truck bed 20. The upper member 12 is rigidly mounted on a tongue portion 22 of a trailer (not completely shown in the drawings) and the hitch engaging member 16 pivots on an axis substantially aligned with the longitudinal axis of the trailer.

The fifth wheel trailer hitch 18 is preferably the type having a frame structure 24 secured to the bed 20 of a truck, generally illustrated as 26, with a pin support member 28 attached to the frame 24 by a pivotal mount 30. The hitch pin support member 28 is constructed to receive and pivotally hold therein a locking pin of the type used with the pin box 10. The pin supporting member 28 is supported by the mount 30 such that it will pivot about an axis transverse to the longitudinal direction of the truck 26.

The upper member 12 comprises a structure defining a plate 32, a conduit member 34 integrally bound to the plate 32, and at least one pair of apertures 36 positioned in the conduit member 34. The structure additionally comprises a pair of ends 38 each portraying a pentahydronal having faces 40 and 42 delineating a trapezoid. Each of the pentahydronals integrally bind to the conduit member 34. Plate 32 may have attached thereto the face 42 or, in a preferred embodiment as shown in FIG. 4, preferably comprises as an integral part thereof the face 42.

The stanchion member 14 comprises a stucture defining a plurality of openings 44 which are paired in a general horizontal registry and collimate with the apertures 36 when stanchion 14 slidably lodges within conduit member 34. This is an important feature of this invention and allows the distance between the upper member 12 and the hitch engaging member 16 to be adjusted. An axis pin 46 removably lodges through openings 44 and apertures 36 to secure the upper member 12 to the stanchion member 14. A carter pin 48 engages through an end of the pin 46 to secure same in place.

A shaft mount for mounting the hitch engaging member 16 is on the lower portion of the stanchion member 14 and has downwardly extending flange portions 48 and 50 on the normally forward side of a bottom 52 and on the normally rearward side on the same as shown. The flange portions 48 and 50 are provided with shaft support members 54 and 56, respectively, for mounting a shaft 59. The mount portion of the stanchion member 14 has a pair of brace members 58 and 60 angularly disposed as shown in FIG. 2 joining the downwardly extending flange portions 48 and 50. The brace members 58 and 60 provide structural strengthening and supporting for the flange members 48 and 50 and due to their position provide some protection for the shaft mount of the hitch engaging member 16.

The hitch engaging member 16 includes a shoe 62 having a coupling pin 64 secured thereto and extending therebelow and a conduit mount 57 above the shoe 62 for receiving and mounting the shaft 59. The shoe 62 is preferably generally circular in planform and has an upturned forward portion 66. The coupling pin 64 is preferably constructed as shown and secured to the shoe 62, preferably by welding. The specific structure of the coupling pin 64 can obviously be modified to be compatible with the particular structure of the fifth wheel hitch 18. The shaft mount 57 is a conduit or hollow member which receives and supports the shaft 59 and is supported by brace members 68 and 70 as shown in FIGS. 2 and 3. The shaft mount 57 is preferably secured by welding to the brace members 68 and 70 in the position shown with the elongated axis thereof in line with the forward-to-rear axis of the shoe 62. The lower portion of the braces 68 and 70 are preferably secured by welding to the upper portion of the shoe 62. Another important feature of this invention is that the axis of the shaft 59 be in longitudinal alignment with the longitudinal axis of the trailer when the adjustable pin box upper member 12 is attached to the trailer tongue portion 22. The shaft mount 57 on the hitch engaging member 16 contacts the center portion of the shaft 59 and the shaft support members 54 and 56 of the flanges 48 and 50 on the mount of the bottom 52 of the stanchion member 14 contact opposite ends of the shaft 59 to support the shaft 59 so that the stanchion member 14 and the hitch engaging member 16 can pivot about the longitudinal axis of the shaft 65. Preferably, the shaft mount 57 functions as a bearing with the opposite ends of the shaft 59 rigidly supported by the support members 54 and 56 of flanges 48 and 50. Securing the mount 57 to the support members 54 and 56 can be accomplished by the use of set screws extending through the support members into the shaft 57 or by welding the opposite ends of the shaft 57 to the support member, or by other suitable means. The shaft mount 57 can be constructed with an aperture therein for lubricating the shaft 59 in its mount to reduce friction. With the stanchion member 14 pivotally mounted to the hitch engaging member 16 it will pivot from side to side as illustrated in FIG. 5 wherein the stanchion member 14 is pivoted slightly to the right relative to the hitch engaging member 16. Preferably, the stanchion member 14 is freely pivotable within structural limits of the flanges 48 and 50 and the shoe 62. Preferably, the stanchion member 14 is constructed such that it will pivot to the side approximately 45° from the vertical in both directions.

In the use of the pin box 10 of this invention, it is preferably mounted on the bottom on the tongue portion 22 of a trailer generally as shown in FIG. 6. The upper member 12 is secured to the structure of the trailer tongue portion 22, preferably by welding or bolting or other suitable means. Pin box 10 is secured to the trailer tongue portion 22 so the upturned or raised portion 66 of the shoe 62 is on the forward side thereof. The axis of the shaft 59 must be positioned in alignment with the longitudinal axis of the trailer. A trailer fitted with the pin box 10 of this invention is coupled with the fifth wheel trailer hitch 18 of a towing vehicle such as the truck 26 in the same manner as are trailers which prior art pin box assemblies. The pin box 10 of this invention due to the pivoting motion of the hitch engaging member 16 will allow the trailer to be coupled with the tractor vehicle when the two vehicles are on an uneven terrain and when there is an angular displacement between the two vehicles. As the fifth wheel hitch 18 is moved into position under the hitch engaging member 16, they will pivot relative to the bed of the towing vehicle and the pin box stanchion member 14 to bring the coupling pin 64 of the hitch engaging member 16 into proper alignment and position in the latch portion of the fifth wheel hitch 14. As this occurs, the shoe 62 will slide on the guide portion 28 of the hitch. The upturned shoe portion 66 is provided to assist in aligning the shoe 62 and the guide portion of the hitch pin support member 28 of the hitch 18 so that precise vertical alignment is not required and so the shoe 62 can be easily slid onto the hitch when the shoe 62 is slightly below the hitch pin support member 28.

In the manufacture of the pin box structure of this invention, it is obvious that the structure can be easily constructed by conventional construction and fabricating techniques to achieve the end product. The pin box structure can be constructed of sufficient strength for use on travel trailers and with small utility trailers and it can also be constructed in larger sizes for the larger semi-trailer type truck trailers. The adjustable list pin box 10 has height adjustment means through utilization of the stanchion member 14 being slidably lodged within the upper member 12. The pivotal connection between the stanchion member 14 and the hitch engaging member 16 is constructed to withstand sustained pulling loads, backing loads, and substantial side forces as are normally encountered in the pin connection portion of a trailer of the type on which the pin box of this invention is designed to be used.

In the use and operation of the pin box structure of this invention, it is seen that same provides a connector for a trailer of the type which is connected with a towing vehicle by a fifth wheel type hitch and that such provides a pivotal connection between the vehicles which allows the trailer to pivot about a longitudinal axis relative to the towing vehicle or tractor vehicle. The pin box structure has a hitch engaging member which is pivotable relative to its attached stanchion member and likewise relative to the tongue portion of the trailer so that when the trailer is being pulled it will pivot about a longitudinal axis relative to the pulling vehicle and when the hitch and hitch engaging member are being coupled or uncoupled the pivotally mounted hitch engaging member will allow such to be done on an uneven terrain. When connecting a trailer having the pin box structure with a pulling vehicle, such makes the job considerably easier as it is not necessary to have the vehicles on a level terrain so the portions of the hitch and the pin will be in proper alignment. As will become apparent from the foregoing description of the applicant's pin box structure, relatively inexpensive and structurally simple means have been provided to pivotally connect a trailer of the type constructed for using a fifth wheel trailer hitch with the fifth wheel type trailer hitch of a tractor vehicle. The pin box structure is economical to manufacture due to the simple construction thereof and it is usable to provide a pivotal connection between a trailer vehicle and a towing vehicle due to the pivotal connection thereof. The pin box structure is adapted to allow a trailer vehicle to pivot about a longitudinal axis relative to the towing vehicle for smoother operation thereof on the road and for easier operation thereof when connecting or disconnecting the trailer and the towing vehicle.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. An adjustable list pin box for interconnecting a tractor and a trailer, or the like, comprising:
   a. an upper member rigidly secured on the tongue portion of a trailer and having a conduit member with an essentially rectangular cross section extending downward therefrom,
   b. a stanchion member having a cross-sectionally rectangular portion slidably mounted in said conduit member, said stanchion member has means to mount a shaft on the lower end portion thereof such that a shaft when mounted will be in position substantially aligning with the longitudinal axis of said trailer, and
   c. a hitch engaging member having a shaft mounting means on an upper portion thereof and mounting a shaft, said shaft being mounted with said means to mount a shaft on said stanchion member, said hitch engaging member being constructed and adapted to in use pivot on an axis substantially aligned with the longitudinal axis of said trailer.

2. The adjustable list pin box of claim 1 wherein said hitch engaging member comprises a shoe on the lower portion thereof, and a coupler pin depending from said shoe.

3. The adjustable list pin box of claim 2 wherein said shoe comprises a substantially circular planform having an upturned forward portion.

4. The adjustable list pin box of claim 3, wherein said shaft mounting means comprises a conduit means attached to said shoe for receiving said shaft therethrough, and said means to mount a shaft aligning with said conduit means to mount said shaft through said means to mount a shaft and through said conduit means for pivoting said hitch engaging member on said longitudinal axis relative to said stanchion member.

5. The adjustable list pin box of claim 4 wherein said upper member comprises a structure defining a plate, said conduit member integrally bound to said plate, and at least one part of apertures positioned in said conduit member.

6. The adjustable list pin box of claim 5 wherein said structure additionally comprises a pair of ends each portraying a pentahydronal having two faces delineating a trapezoid, said pentahydronals integrally binding to said conduit member, and said plate comprising as an integral part thereof one of said two faces of each of said pentahydronals.

7. The adjustable list pin box of claim 6 wherein said stanchion member comprises a structure defining a plurality of openings, said plurality of openings being paired in generally horizontal registry and collimating with said apertures for inserting an axis pin therethrough to secure said upper member to said stanchion member and for adjusting the distance of said upper member from said hitch engaging member.

8. The adjustable list pin box of claim 7, wherein said shaft is positioned over a center portion of said coupler pin, said shaft mounting means comprises a pair of brace members attaching to said shoe and a conduit connected to said brace members, said last named conduit receiving and supporting said shaft and mounting over a center portion of said hitch engaging member, said means to mount a shaft includes a means for engaging opposite end portions of said shaft, and said stanchion member additionally comprises a pair of downwardly extending flange portions which includes said means for engaging.

9. In a tractor having a fifth wheel trailer hitch means and a trailer having a tongue portion adapted for use with said fifth wheel trailer hitch means, an adjustable list pin box therein and therewith, comprising in combination:
   a. an upper member rigidly secured on the tongue portion of said trailer and having a conduit member with an essentially rectangular cross section extending downwardly therefrom,
   b. a stanchion member having a cross-sectionally rectangular portion slidably mounted in said conduit member said stanchion member has means to mount a shaft on the lower end portion thereof such that a shaft when mounted will be in position substantially aligning with the longitudinal axis of said trailer, and
   c. a hitch engaging member having a shaft mounting means on an upper portion thereof and mounting a shaft, said shaft being mounted with said means to mount a shaft on said stanchion member, said hitch engaging member being constructed and adapted to in use pivot on an axis substantially aligned with the longitudinal axis of said trailer.

10. The adjustable list pin box of claim 9 wherein said hitch engaging member comprises a shoe on the lower portion thereof, and a coupler pin depending from said shoe.

11. The adjustable list pin box of claim 10 wherein said shoe comprises a substantially circular planform having an upturned forward portion.

12. The adjustable list pin box of claim 11 wherein said shaft mounting means comprising a conduit means attached to said shoe for receiving said shaft therethrough, and means to mount includes a shaft being aligning with said conduit means to mount said shaft through said means to mount a shaft and through said conduit means for pivoting said hitch engaging member on said longitudinal axis relative to said stanchion member.

13. The adjustable list pin box of claim 12 wherein said upper member comprises a structure defining a plate, said conduit member integrally bound to said plate, and at least one pair of apertures positioned in said conduit member.

14. The adjustable list pin box of claim 13 wherein said structure additionally comprises a pair of ends each portraying a pentahydronal having two faces delineating a trapezoid, said pentahydronals integrally binding to said conduit member, and said plate comprising as an integral part thereof one of said two faces of each of said pentahydronals.

15. The adjustable list pin box of claim 14 wherein said stanchion member comprises a structure defining a plurality of openings, said plurality of openings being paired in generally horizontal registry and collimating with said apertures for inserting an axis pin therethrough to secure said upper member to said stanchion member and for adjusting the distance of said upper member from said hitch engaging member.

16. The adjustable list pin box of claim 15 wherein said shaft is positioned over a center portion of said coupler pin, said shaft mounting means comprises a pair of brace members attaching to said shoe and a conduit connected to said brace members, said last named conduit receiving and supporting said shaft and mounting over a center portion of said hitch engaging member, said means to mount a shaft includes a means for engaging opposite end portions of said shaft, and said stanchion member additionally comprises a pair of downwardly extending flange portions which includes said means for engaging.

* * * * *